United States Patent [19]

Sayers

[11] 4,011,057
[45] Mar. 8, 1977

[54] HINDERED PHENOL ANTIOXIDANT COMPOSITION CONTAINING AN AMINO COMPOUND

[75] Inventor: George Alvin Sayers, Penns Grove, N.J.

[73] Assignee: E. I. Du Pont de Nemours and Company, Wilmington, Del.

[22] Filed: Apr. 16, 1974

[21] Appl. No.: 461,391

[52] U.S. Cl. .................................. 44/52; 44/72; 44/75; 252/403
[51] Int. Cl.² ................................. C10L 1/22
[58] Field of Search ........... 44/52, 72, 75; 252/403; 260/624

[56] References Cited

UNITED STATES PATENTS

| | | |
|---|---|---|
| 1,748,507 | 1/1930 | Brooks .................................. 44/52 |
| 2,202,877 | 6/1940 | Stevens et al. ......................... 44/78 |
| 2,459,597 | 1/1949 | Stillson et al. ...................... 44/78 X |
| 2,521,425 | 9/1950 | Thompson ............................. 44/75 |
| 2,672,408 | 3/1954 | Bonner .................................. 44/72 |
| 2,793,943 | 5/1957 | Moore .................................. 44/72 |
| 2,908,558 | 10/1959 | Brimer .................................. 44/75 |
| 3,166,509 | 1/1965 | Ecke ...................................... 44/78 |

*Primary Examiner*—Daniel E. Wyman
*Assistant Examiner*—Mrs. Y. Harris-Smith
*Attorney, Agent, or Firm*—James A. Costello

[57] ABSTRACT

An improved antioxidant composition comprising hindered phenol antioxidant wherein the improvement comprises, in combination with the hindered phenol, from about 1% to 10%, by total weight, of at least one amino compound having a pKb of from 0.3 to 8.0.

12 Claims, No Drawings

HINDERED PHENOL ANTIOXIDANT COMPOSITION CONTAINING AN AMINO COMPOUND

BACKGROUND OF THE INVENTION

1. Field of the Invention

This invention concerns antioxidant compositions, especially antioxidant compositions for gasoline. The compositions comprise primarily hindered phenols in combination with a small amount of an amine. The compositions are characterized by reduced crystallization temperature, lighter color, and enhanced antioxidant efficiency, over compositions that are similar except that they do not have the amine present.

2. Description of the Prior Art

Phenolic antioxidants are preferred for modern gasolines which have relatively low olefin content, because of their low cost and increasing relative antioxidant efficiency with decreasing olefin content of the gasoline. Principal commercially employed antioxidants are the alkylated phenols, N,N'-dialkylated para-phenylenediamines and N-alkylated para-aminophenols.

Alkylated phenol antioxidants usually contain a tertiary alkyl group ortho to the hydroxyl group. Included are 2,6-ditert.-butyl-4-methylphenol, 2,4-dimethyl-6-tert.-butylphenol, 2,4-ditert.-butylphenol, 2,6-ditert.-butylphenol, 2-tert.-butylphenol, 4,4'-methylene-bis(2,6-ditert.-butylphenol), 4,4'-thiobis(2,6-ditert.-butylphenol) and the like. Such phenols containing the bulky tertiary alkyl group at one or both ortho positions are often referred to as hindered phenols.

Most hindered phenols are solids at ambient temperatures or they are liquids which crystallize when exposed to low temperatures such as are encountered during the winter months in colder climates. It is generally preferred that a gasoline additive be liquid for ease of addition and lower costs. Using solvents to provide hindered phenol as concentrated solutions is not completely satisfactory since the phenols are still subject to crystallization from solution at low temperatures. Further, the increased cost of preparing, handling and shipping solutions makes this unattractive. There is, therefore, a need for a practical liquid hindered phenol antioxidant composition which is resistant to solidification (crystallization) at relatively low temperatures. Also desirable would be for such composition to have good light color and good efficiency.

SUMMARY OF THE INVENTION

This invention concerns an improved antioxidant composition comprising hindered phenol antioxidant wherein the improvement comprises, in combination with the hindered phenol, from about 1% to 10%, by weight of the antioxidant composition, of at least one amino compound having a $pK_b$ of from about 0.3 to 8.0.

The amino compound can be ammonia or a hydrocarbyl-substituted ammonia compound. The substituted ammonia will contain up to about 49 carbon atoms. The common characteristic of the contemplated amino compounds is that they are nitrogen bases of $pK_b$ 0.3 to 8.0. The smaller the $pK_b$ the greater the base strength of the amino compound, the term $pK_b$ meaning $-\log K_b$ where $K_b$ is the basic dissociation constant of the amino compound in water at 25° C.

Ammonia has a $pK_b$ of 4.75 while substituted ammonia compounds such as methylamine ($pK_b$ 3.37), ethylamine ($pK_b$ 3.27), isopropylamine ($pK_b$ 3.37), ethanolamine ($pK_b$ 4.56) are slightly stronger bases than ammonia. Guanidine, a very strong organic base has a $pK_b$ or 0.3. Generally, for an amino compound to have a $pK_b$ of 8 or less the substituent on the amino nitrogen will be attached to the nitrogen atom via an aliphatic or cycloaliphatic carbon atom, even though such carbon atom can also have aromatic substituents. Thus, benzylamine has a $pK_b$ of 4.70 while aniline (outside the invention) has a $pK_b$ of 9.30. The preferred amino compound will have a $pK_b$ of from about 3 to about 5.

The preferred antioxidant compositions of this invention contain from about 3 to 6% of the amino compound(s), based on total weight of the antioxidant. The amino compound(s) have been found, surprisingly, to exercise synergistic antioxidant qualities with the hindered phenols, even in the relatively small amounts of 10% or less that are contemplated herein.

The hindered phenol portion of the antioxidant of this invention can be single phenols or mixtures of phenols. The term "hindered phenol" as employed herein, depending on the context, includes mixtures of hindered phenols. The preferred hindered phenol is tertiary butylated phenol. Especially preferred is tertiary butylated phenol containing at least about 60% of 2,4-ditert.-butylphenol. The most preferred amino compound is 1,2-diaminopropane.

The term hydrocarbyl as employed herein includes aliphatic hydrocarbyl (such as alkyl and alkenyl), cycloaliphatic hydrocarbyl (such as cyclopentyl, cyclohexyl and cycloheptyl), and araliphatic hydrocarbyl (such as benzyl, tolylyl, xylylyl and 2-phenylethyl). The total number of carbon atoms is preferably 1 to 20 carbons.

This invention also concerns a gasoline fuel composition containing the novel antioxidants of this invention. The concentration of the antioxidants will usually be from about 1 to 10 lbs. per 1,000 barrels.

DETAILS OF THE INVENTION

Hindered phenols are usually prepared by alkylation of a phenol or an alkylphenol containing at least one free ortho position with a 1,1-dialkylmonoolefin. More usually the 1,1-dialkylmonoolefin is isobutylene so that the tertiary alkyl group introduced is the tertiary butyl group. Methods of alkylating phenols with olefins are well known in the art and the present invention is not dependent upon any particular method of preparation of the hindered phenols.

Most contemplated hindered phenol antioxidants are not single compounds but are mixtures of alkylated phenols. For example, when phenol is alkylated with isobutylene, the reaction mass generally contains two or more of the following: 2-tert.-butylphenol, 4-tert.-butylphenol, 2,4-ditert.-butylphenol, 2,6-ditert.-butylphenol and 2,4,6-tritert.-butylphenol. The composition of the mixed hindered phenol depends, of course, upon the particular catalyst used, the ratio of isobutylene to the phenol used, and the reaction conditions such as time and temperature.

Most of the tertiary butylated phenols are solids at ordinary temperatures as indicated by the melting points given below.

| Hindered Phenol | Melting Point °C. |
|---|---|
| 4-tert.-butylphenol | 98.4 |
| 2,4-ditert.-butylphenol | 56.5 |
| 2,6-ditert.-butylphenol | 39 |
| 2,4,6-tritert.-butylphenol | 131 |

Commercial mixtures of tertiary butylphenols ordinarily have crystallization temperatures of from about 0° to about 30° C. By crystallization temperature is meant the highest temperature at which a seeded sample of the phenol will develop crystals. The crystallization temperature is therefore a measure of the tendency of the composition to solidify or form crystals. Since such antioxidant compositions are very often exposed to temperatures lower than the crystallization temperature range of 0° to 30° C., particularly during the winter months in the colder sections of the northern and southern hemispheres, partially or completely solidified compositions often result.

The hydrocarbyl-substituted ammonia compounds that are useful together with the antioxidants noted above, can be primary, secondary, or tertiary amines and include one or more members from one or more of the following groups.

i. Hydrocarbylamines of the formula,

wherein each R represents hydrogen or a hydrocarbyl group which has 1 to 24 carbon atoms, the R being joined to the nitrogen atom through a saturated carbon. At least one of the R groups is a hydrocarbyl group.

Representative compounds are primary, secondary and tertiary amines such as methylamine, dimethylamine, trimethylamine, ethylamine, diethylamine, triethylamine, n-propylamine, di-n-propylamine, tri-n-propylamine, isopropylamine, diisopropylamine, triisopropylamine, n-butylamine, di-n-butylamine, tri-n-butylamine, methylethylamine, dimethylethylamine, n-amylamine, di-n-amylamine, n-hexylamine, di-n-hexylamine, 2-ethylhexylamine, n-decylamine, n-decenylamine, dodecylamine, stearylamine, oleylamine, N,N-dimethyloleylamine, cyclohexylamine, dicyclohexylamine, N-methylcyclohexylamine, N,N-dimethylcyclohexylamine, N,N-diethylcyclohexylamine, benzylamine, p-tolylylamine, n-xylylylamine and the like.

Also included in (i) are mixed tertiary alkyl primary amines having 12 to 14 carbon atoms (marketed as "Primene" 81R) and mixed tertiary alkyl primary amines having from 18 to 21 carbon atoms (Primene JM-T). Also included are tertiary nonylamines consisting mainly of $C_9$ amine with small amounts of $C_8$ and $C_{10}$ amines; cocoamine, a mixture of $C_{8-18}$ n-alkyl primary amines with the $C_{12}$ predominating; and tallowamine, a mixture of stearyl, palmityl and oleylamines.

ii. Hydroxyalkyl- and hydroxy(alkyleneoxy) alkylamines of the formula, $R_2N(R'O)_xH$, where R is hydrogen, hydrocarbyl, or $(R'O)_xH$, wherein R' is alkylene of 2 to 3 carbon atoms and x is from 1 to 5. Exemplifying compounds are ethanolamine, diethanolamine, triethanolamine, propanolamine, dipropanolamine, tripropanolamine, N-(2-hydroxyethyl)methylamine, N,N-bis(2-hydroxyethyl)methylamine, N-(3-hydroxypropyl)ethylamine, N,N-bis(3-hydroxypropyl)propylamine, N-(2-hydroxypropyl)ethylamine, N,N-bis(2-hydroxypropyl)methylamine, N,N-bis(triethoxylated)butylamine, N,N-bis(tetraethoxylated)oleylamine, N,N-bis(pentaethoxylated)oleylamine and the like.

iii. Cyclic amines of the formula, R-NY, where R is a hydrogen or hydrocarbyl, y is a divalent connecting group such as $-(CH_2)_m-$, where $m = 4$ to 6, $-CH_2CH_2-NHCH_2CH_2-$, $-CH_2CH_2-O-CH_2CH_2-$. Representative examples are piperidine, N-methylpiperidine, N-ethylpiperidine, piperazine, N-methylpiperazine, N-ethylpiperazine, morpholine, N-methylmorpholine, N-ethyl morpholine and the like.

iv. Amino compounds of the formula,

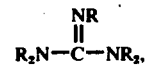

wherein R represents hydrogen or hydrocarbyl. This class includes guanidine and alkylated guanidines such as monomethylguanidine, dimethylguanidine, trimethylguanidine, tetramethylguanidine, pentamethylguanidine and the like alkylguanidines.

v. Polyamines of the formula, $R_2N-(R'NR)_xR$, where R is hydrogen or hydrocarbyl, R' is alkylene of 2 to 8 carbon atoms and x is 1 to 5. In the preferred subclass, R is hydrogen or lower ($C_1-C_4$) alkyl. Representative compounds are ethylenediamine, diethylenetriamine, triethylenetetramine, tetraethylenepentamine, pentaethylenehexamine, propylene(1,3)diamine, dipropylene(1,3)triamine, tripropylene(1,3)tetramine, tetrapropylene(1,3)pentamine, pentapropylene(1,3)hexamine, propylene(1,2)diamine, dipropylene(1,2)triamine, tripropylene(1,2)tetramine, tetrapropylene(1,2)pentamine, pentapropylene(1,2)hexamine, 1,4-diaminobutane, 1,5-diaminopentane, 1,6-diaminohexane, 1,8-diaminooctane. Included in the polyalkylenepolyamines are substituted polyamines such as N,N-dimethylpropylene(1,3)-diamine, N,N-dimethylethylenediamine, N,N,N',N'-tetramethylethylenediamine, and the like.

The exact amount of the amine that is used, within the range of 1 to 10%, depends on the phenolic component, the amine component and the effect desired. While the amount of reduction in the crystallization temperature of a hindered phenol depends upon the particular phenol composition, and the particular amino compound employed, in every case a substantial reduction in crystallization temperature is obtained.

Although the color of a hindered phenol composition does not normally affect its antioxidant performance, light-colored compositions are desirable. It has now been found that incorporating amino compounds into an off-color or discolored hindered phenol composition usually results in a lighter colored product.

The present invention composition is added to distillate fuels to provide antioxidant protection thereto. The distillate fuels include fuel oils, aviation gasoline and motor gasoline. The invention composition is particularly useful in gasolines, both aviation and motor. The distillate fuels can contain other additives normally used, including antiknock compounds, such as tetraethyllead, tetramethyllead, mixed alkyllead, lead scavenging agents, antiicing agents, anticorrosion agents, dyes, carburetor detergents and the like, as long as the primary antioxidant function of the novel compositions is not compromised.

The following Examples illustrate the invention. The commercial hindered phenols designated Preparations 1-8, were all mixed tertiary butylated phenols wherein the major component was 60 to 65% by weight of 2,4-di-tert.-butylphenol. Other components were 2 to 7% of 2-tert.-butylphenol, 2 to 7% of 4-tert.-butylphenol, and 15% to 20 of 2,4,6-tri-tert.-butylphenol, balance primarily poly-isobutylene. All of the Preparations were made commercially by the same general procedure. They were, however, selected from different lots. The constituency of each of the Preparations fell within the range set out above and, although possible, it is not likely that any two of the Preparations had identical constituency by weight.

ASTM D1500, which involves matching of the color of the sample versus glass color standards. The results are expressed in terms of ASTM color which ranges from 0.5 to 8.0 in 0.5 increments, the higher the value the darker the color. When the color of the sample is intermediate between two standard glasses, the value corresponding to the darker glass standard is given the prefix L.

The results are summarized in Table 1 wherein temperatures are given to the nearest whole degree Centigrade.

TABLE 1

CRYSTALLIZATION TEMPERATURES AND ASTM COLORS

| Hindered Phenol | Amine (5 wt.%) | Crystallization Temperature ° C. | Δ° C. | ASTM Color |
|---|---|---|---|---|
| Preparation 1 | none | 24 | — | 2.5 |
| | + monoethanolamine | below −18 | 42+ | L 2.0 |
| | + isopropylamine | −3 | 27 | L 2.5 |
| | + 1,2-diaminopropane | below −18 | 42+ | L 2.0 |
| Preparation 2 | none | 3 | — | 4.0 |
| | + monoethanolamine | below −18 | 21+ | L 3.5 |
| | + isopropylamine | below −18 | 21+ | L 4.0 |
| | + 1,2-diaminopropane | below −18 | 21+ | |
| Preparation 3 | none | 24 | — | L 2.5 |
| | + monoethanolamine | 0 | 24 | L 2.0 |
| | + isopropylamine | 11 | 13 | L 2.0 |
| | + 1,2-diaminopropane | below −18 | 42+ | L 1.5 |
| Preparation 4 | none | 24 | — | L 1.5 |
| | + monoethanolamine | 9 | 15 | L 1.5 |
| | + isopropylamine | 13 | 11 | L 1.5 |
| | + 1,2-diaminopropane | 5 | 19 | L 1.5 |
| Preparation 5 | none | 21 | — | 4.5 |
| | + tetraethylenepentamine | below −13 | 34+ | 3.5 |
| | + triethylenetetramine | below −13 | 34+ | 3.0 |
| | + diethylenetriamine | below −13 | 34+ | L 3.0 |
| Preparation 6 | none | 14 | — | — |
| | + 5% ammonia | below −18 | 32+ | — |

EXAMPLE 1

The effectiveness of the amines in reducing the crystallization temperatures of commercial hindered phenol antioxidants was demonstrated by determining the highest temperature at which crystal formation occurs in seeded samples.

The crystallization temperature was determined by placing 40 ml of the liquid phenol in a Dewar tube of three-fourths inch diameter. The phenol sample was seeded with about 5 mg of solid 2,4-di-tert.-butylphenol and a thermometer and a stirrer (a length of wire with coils at the end) were placed in the sample. The tube was then placed in a larger Dewar flask containing acetone. Solid carbon dioxide (dry ice) was added to acetone in the larger Dewar flask and the sample was cooled slowly. Cooling and stirring were continued until the formation of solid was observed. The temperature at which the solid formation took place was recorded as the crystallization temperature.

Colors of the hindered phenols with and without amine additives were measured by the method of The results of Table 1 clearly show that the amino compounds markedly reduce the crystallization temperature, there being some variability in the size of the crystallization temperature reduction depending upon the particular hindered phenol treated. The results also show that the amino compounds improve the color of the hindered phenols, particularly those phenols which have high ASTM colors.

EXAMPLE 2

This Example shows the effect of the amine concentration on the crystallization temperature. The procedure described in the previous Example was used to determine the crystallization temperature. The hindered phenol used was commercial sample, Preparation 7.

The results, summarized below to the nearest whole ° C., show that further lowering of the crystallization temperature is obtained with the increasing concentration of amine. In this particular batch of commercial hindered phenol, 4 to 5 weight percent of the amine is sufficient to lower the crystallization temperature to about −18° C. If a lower crystallization temperature is desired, it is clear that concentrations of amine greater than 5% will provide it.

| | Crystallization Temperature Wt. % Amine in Hindered Phenol | | | | | | | | | |
|---|---|---|---|---|---|---|---|---|---|---|
| | 0 | 1 | | 2 | | 3 | | 4 | | 5 |
| Amine | ° C. | ° C. | Δ° C. | ° C. | Δ° C. | ° C. | Δ° C. | ° C. | Δ° C. | ° C. | Δ° C. |
| 1,2-diaminopropane | 23 | 18 | 5 | 12 | 11 | −2 | 25 | −17 | 40 | — | — |

| | Crystallization Temperature Wt. % Amine in Hindered Phenol | | | | | | | | | |
|---|---|---|---|---|---|---|---|---|---|---|
| | 0 | 1 | | 2 | | 3 | | 4 | | 5 |
| Amine | °C. | °C. | Δ°C. | °C. | Δ°C. | °C. | Δ°C. | °C. | Δ°C. | °C. | Δ°C. |
| ethanolamine | 23 | 17 | 6 | 12 | 11 | +2 | 21 | −6 | 29 | −18 | 41 |

EXAMPLE 3

Antioxidant efficiencies of hindered phenols containing amino compounds were determined by the ASTM D525 method. The test consists of heating a sample of gasoline (50 ml) in a bomb pressurized with oxygen to 100 psi (7.0 kg per sq. cm.) at 100° C. and measuring the time necessary for the break point. The break point is a point in the pressure-time curve that is preceded by a pressure drop of exactly 2 psi (0.15 kg per sq. cm.) within 15 minutes and succeeded by a drop of not less than 2 psi in 15 minutes. The induction time is the time elapsed between the placing of the bomb in the bath and the break point at 100° C. The longer the induction period, the more efficient the antioxidant.

The antioxidant efficiencies given below are based on antioxidant efficiencies arbitrarily fixed at 100 for the gasolines containing the commercial hindered phenol antioxidant alone with no amine present. The gasolines used in the test were three different regular grade gasolines, each containing 3 mls. per gallon of tetraethyllead anitknock composition. The results summarized in Table 2 show that the antioxidant efficiency caused by the hindered phenol composition containing the amino compound is greater than that caused by the hindered phenol (Preparation 8) alone. The results are surprising, since the amino compounds themselves provide very little antioxidant activity.

oxygen atmosphere at 100° C. and the time to the lead break is determined. This is the time in hours at which a pressure drop of 2 psi within 15 minutes occurs followed by a drop of at least 2 psi in the next 15 minutes.

The time to lead break is indicative of the oxidative breakdown of the lead antiknock composition. A time to lead break of sixteen hours is considered satisfactory performance. The efficiency of the commercial antioxidant was arbitrarily set at 100. Said antioxidant was the same as that employed in Example 3 (and Table 2). The fuel was commercial aviation 100/130 grade gasoline containing 3 ml/gallon of tetraethyllead. Primene 81R (Rohm and Haas) designates a product containing mixed t-alkyl primary amines of 12 to 14 carbon atoms.

The results summarized in Table 3 show that the hindered phenol compositions of the present invention are highly effective in stabilizing leaded aviation gasoline. It can be seen that the efficiency of each invention composition is more than double that of the hindered phenol itself.

TABLE 3

| Antioxidant | lbs./1000 Barrels | Hours to Lead Break | Antioxidant Efficiency |
|---|---|---|---|
| None | — | 6 | |
| Preparation 8 | 8.4 | 12 | 100 |
| | | 21 | 250 |

TABLE 2

| Comparison of Antioxidant Efficiency | | | | |
|---|---|---|---|---|
| | | Antioxidant Efficiency in | | |
| Antioxidant | lbs./1000 bbls. | Gasoline A | Gasoline B | Gasoline C |
| Preparation 8 | 10 | 100 | | |
| | 6 | | 100 | |
| | 6 | | | 100 |
| Monoethanolamine | 0.5 | 39 | 10 | 12 |
| Isopropylamine | 0.5 | 36 | 24 | 12 |
| 1,2-Diaminopropane | 0.5 | 54 | 37 | 26 |
| Preparation 8 and Monoethanolamine | 9.5 0.5 | 122 | | |
| Preparation 8 and Monoethanolamine | 5.7 0.3 | | 126 | 107 |
| Preparation 8 and Isopropylamine | 9.5 0.5 | 124 | | |
| Preparation 8 and Isopropylamine | 5.7 0.3 | | 134 | 105 |
| Preparation 8 and 1,2-Diaminopropane | 9.5 0.5 | 144 | | |
| Preparation 8 and 1,2-Diaminopropane | 5.7 0.3 | | 132 | 106 |

EXAMPLE 4

Stabilization of aviation gasoline with the phenol compositions of the present invention was demonstrated according to the ASTM D873 method. The test consists of heating the gasoline in a bomb filled with oxygen for a certain length of time and the amounts of soluble gum, insoluble gum and precipitate formed are weighed. With leaded aviation gasoline a modification used in the industry consists of heating a sample in an

| Preparation 8 and monoethanol-amine | 8.0 0.4 | 22 | 267 |
|---|---|---|---|
| Preparation 8 and isopropyl-amine | 8.0 0.4 | | |

TABLE 3-continued

| Antioxidant | lbs./1000 Barrels | Hours to Lead Break | Antioxidant Efficiency |
| --- | --- | --- | --- |
| Preparation 8 and 1,2-diamino-propane | 8.0<br>0.4 | 24 | 300 |
| Preparation 8 and 2-ethyl-hexylamine | 8.0<br>0.4 | 22 | 267 |
| Preparation 8 and "Primene" 81R | 8.0<br>0.4 | 22 | 267 |

The embodiments of the invention in which an exclusive property or privilege is claimed are defined as follows:

1. In an antioxidant composition comprising hindered phenol antioxidant, the improvement comprising, in combination with the hindered phenol, from 1% to 10%, based on the combined weight, of at least one amino compound having a $pK_b$ of from 0.3 to 8.0, the amino compound being selected from the group consisting of i. hydrocarbylamines of the formula,

wherein each R represents hydrogen or a hydrocarbyl group which has 1 to 24 carbon atoms, the R being joined to the nitrogen atom through a saturated carbon, at least one of the R groups being a hydrocarbyl group, ii. hydroxyalkyl- and hydroxy(alkyleneoxy) alkylamines of the formula, $R_2N(R'O)_xH$, where R is hydrogen, hydrocarbyl, or $(R'O)_xH$, wherein R' is alkylene of 2 to 3 carbon atoms and x is from 1 to 5, iii. cyclic amines of the formula, R-NY, where R is hydrogen or hydrocarbyl, Y is the divalent connecting group $—(CH_2)_m—$, where $m = 4$ to 6, $—CH_2CH_2-NHCH_2CH_2—$, or $—CH_2CH_2—O—CH_2CH_2-$, iv. amino compounds of the formula,

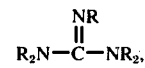

wherein R represents hydrogen or hydrocarbyl, v. polyamines of the formula, $R_2N-(R'NR)_xR$, where R is hydrogen or hydrocarbyl, R' is alkylene of 2 to 8 carbon atoms and x is 1 to 5, and vi. ammonia.

2. A composition according to claim 1 wherein the hindered phenol antioxidant is tertiary butylated phenol.

3. A composition according to claim 2 wherein the tertiary butylated phenol comprises at least 60% of 2,4-ditert.-butylphenol.

4. A composition according to claim 1 wherein the amino compound is 1,2-diaminopropane.

5. A composition according to claim 1 wherein the amino compound comprises from 3 to 6% of the combined weight of the antioxidant.

6. A composition according to claim 2 wherein the amino compound is 1,2-diaminopropane.

7. A composition according to claim 2 wherein the amino compound is monoethanolamine.

8. A composition according to claim 2 wherein the amino compound is isopropylamine.

9. A composition according to claim 3 wherein the amino compound is 1,2-diaminopropane.

10. A composition according to claim 3 wherein the amino compound is monoethanolamine.

11. A composition according to claim 3 wherein the amino compound is isopropylamine.

12. A composition according to claim 1 wherein the $pK_b$ of the amino compound is between 3 to 5.

* * * * *